United States Patent
Minero Ramales

(10) Patent No.: US 12,187,115 B2
(45) Date of Patent: *Jan. 7, 2025

(54) AIR FLOW CONTROL DEVICE FOR A FRONT FACE MODULE OF A MOTOR VEHICLE

(71) Applicant: Valeo Systemes Thermiques, La Verriere (FR)

(72) Inventor: Victor Manuel Minero Ramales, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,236

(22) Filed: Nov. 7, 2023

(65) Prior Publication Data

US 2024/0066976 A1    Feb. 29, 2024

Related U.S. Application Data

(63) Continuation of application No. 17/685,500, filed on Mar. 3, 2022, now Pat. No. 11,845,331.

(51) Int. Cl.
*B60K 11/08* (2006.01)
(52) U.S. Cl.
CPC .................................. *B60K 11/085* (2013.01)
(58) Field of Classification Search
CPC ................................................... B60K 11/085
See application file for complete search history.

(56) References Cited

U.S. PATENT DOCUMENTS

| | | |
|---|---|---|
| 8,807,166 B2 | 8/2014 | Charnesky et al. |
| 9,110,896 B2 | 8/2015 | Jeong et al. |
| 9,758,031 B2 | 9/2017 | Edwards |
| 9,902,256 B2 | 2/2018 | Yamamoto et al. |
| 10,189,349 B2 | 1/2019 | Watanabe et al. |
| 10,391,855 B2 * | 8/2019 | Brueckner ........... B60K 11/085 |
| 10,391,857 B2 | 8/2019 | Schoening |

(Continued)

FOREIGN PATENT DOCUMENTS

| | | |
|---|---|---|
| CN | 208085479 U | 11/2018 |
| CN | 111542449 A | 8/2020 |

(Continued)

OTHER PUBLICATIONS

European Patent Office, International Search Report and Written Opinion of corresponding International Application No. PCT/IB2023/000116, dated Jul. 12, 2023.

*Primary Examiner* — Kurt Philip Liethen
(74) *Attorney, Agent, or Firm* — Valeo Systemes Thermiques

(57) ABSTRACT

An air flow control device for a front face module of a motor vehicle, the control device including a frame and a plurality of vanes extending within and attached thereto in a rotatable manner, each vane being rotatable about an axis of rotation substantially parallel to the main extension direction of each vane. The vanes being able to rotate between an open position and a closed position. The frame includes an integral support bar extending in direction perpendicular to the main extension direction of the vanes, with the vanes having fins configured to rest on the support bar when the vanes are closed and pressured towards the support bar.

10 Claims, 6 Drawing Sheets

(56) References Cited

U.S. PATENT DOCUMENTS

| | | | |
|---|---|---|---|
| 10,449,850 B2 | 10/2019 | Gillard | |
| 2012/0097464 A1* | 4/2012 | Waugh | B60K 11/085 |
| | | | 180/68.1 |
| 2012/0305818 A1 | 12/2012 | Charnesky et al. | |
| 2013/0275009 A1 | 10/2013 | Sakai | |
| 2017/0096060 A1 | 4/2017 | Povinelli | |
| 2019/0299747 A1 | 10/2019 | Lanard et al. | |
| 2020/0307371 A1 | 10/2020 | Vacca et al. | |
| 2020/0324642 A1 | 10/2020 | Guyon | |

FOREIGN PATENT DOCUMENTS

| | | |
|---|---|---|
| CN | 212827873 U | 3/2021 |
| CN | 113043836 A | 6/2021 |
| DE | 102017105568 A1 | 9/2018 |
| DE | 102017107384 A1 | 10/2018 |
| EP | 2602144 A1 | 6/2013 |
| EP | 3272565 A1 | 1/2018 |
| EP | 3427988 A1 | 1/2019 |
| EP | 3634799 A1 | 1/2019 |
| FR | 3064542 A1 | 10/2018 |
| KR | 20120053116 A | 5/2012 |
| WO | 2021104992 A1 | 3/2021 |
| WO | 2021133890 A2 | 7/2021 |

\* cited by examiner

AIR FLOW CONTROL DEVICE FOR A FRONT FACE MODULE OF A MOTOR VEHICLE

TECHNICAL FIELD

The field of the present invention is that of the thermal treatment of different zones or components of a motor vehicle. More specifically, the present invention relates to the cooling units that are used to this end, and it more particularly relates to the devices that are used to modulate the circulation of an air flow within such units.

BACKGROUND OF THE INVENTION

The use of movable vanes is known, for example, vanes that are placed on the front face of the vehicle, in particular in order to reduce the drag coefficient of a motor vehicle. Such movable vanes, the movements of which are, for example, governed by an actuator connected to an electric drive motor, also allow the cooling and/or air-conditioning performance capabilities within the vehicle to be improved. More generally, such movable vanes allow the circulation of an air flow to be controlled that is intended to pass through one or more elements arranged in an engine compartment of the vehicle.

Such devices are preferably placed on a front grille of the relevant motor vehicle, and are known using the acronym AGS for "Active Grille Shutter". In the open position of the movable vanes of such devices, air can circulate through the grille and particularly help to cool the engine of the vehicle, for example, by passing through one or more heat exchangers of a cooling unit of the vehicle. In the closed position of the movable vanes of such devices, the circulation of air through the grille is blocked, which reduces the drag of the vehicle, thus allowing the fuel consumption and, in particular, the emission of carbon dioxide to be reduced An AGS device as described above therefore allows, as long as the engine of the vehicle does not need to be cooled with the outside air, the energy consumption of the vehicle and the pollution generated thereby to be reduced. In a known manner, in the closed position, the movable vanes of such devices together form a substantially flat surface.

The vanes are exposed to pressure resulting from vehicles movement, either due to air or water (during a so called fording). As the vanes are long and are usually supported only on sides, the pressure produces a high deformation in the middle of the vane. In some cases, the deformation causes unwanted contact with elements, like a cooling module, located further downstream—this may happen in particular in the closed position of the vanes. On the other hand, at the open configuration of the AGS the same long vane can produce deformation in the vertical direction due to vibration, creating unwanted noise.

It would be desirable to provide an air flow control device which would alleviate the above mentioned problems. In particular, it would be desirable to solve the above mentioned problems in a cost effective and simple manner.

BRIEF SUMMARY OF THE INVENTION

The object of the invention is, among others, an air flow control device for a front face module of a motor vehicle, said control device comprising a frame and a plurality of vanes extending within and attached thereto in a rotatable manner, each vane being rotatable about an axis of rotation substantially parallel to the main extension direction of each vane, the vanes being able to rotate between an open position and a closed position, wherein the frame comprises an integral support bar extending in Vi direction perpendicular to the main extension direction of the vanes, wherein the vanes have fins configured to rest on the support bar when the vanes are closed and pressured towards the support bar.

In one embodiment, the fins protrude from the vanes for a distance substantially corresponding to the distance between vanes in the open positions.

In one embodiment, the frame comprises a support protrusion at one end of the support bar protruding towards the closest vane so that it substantially abuts it in its open position.

In one embodiment, the frame comprises a support groove at one end of the support bar configured to receive a fin of the closest vane.

In one embodiment, the support bar has a guiding groove extending along its length to receive fins in any position.

In one embodiment, the support bar comprises quarter-circle cutouts in which the vanes in the closed position are received and supported, the cutouts being shaped to guide the movement of the vanes towards the open position.

In one embodiment, the support bar is perforated.

In one embodiment, the fins have substantially triangular shapes.

In one embodiment, the fins have substantially semicircular shapes.

In one embodiment, the edges of the fins comprise a vibration damping material.

In one embodiment, the device comprises a plurality of support bars, the vanes comprising a plurality of respective fins adapted to operate with said support bars.

According to the invention, each vane is in the general form of a blade or a thin panel extending in a main extension direction, also denoted hereafter as longitudinal direction of the considered vane. With reference to the aforementioned longitudinal direction, the transverse direction of a vane is defined as the direction that defines, with the previously defined longitudinal direction, the active surface of the vane, i.e. the surface of the vane intended to be placed in an air flow in order to modify or not modify the flow before it reaches a cooling unit of the vehicle. The vertical direction of the vane is also defined as the direction perpendicular both to the previously defined longitudinal direction and to the transverse direction of the vane, with the vertical direction consequently defining the thickness of the vane.

For each of the vanes of the assembly according to the invention, the previously defined longitudinal direction, transverse direction and vertical direction together form a direct trihedron. For flow reasons, as well as for reasons associated with the installation and/or manufacturing constraints, each vane can have a substantially convex shape in the transverse direction thereof. The vertical direction of a vane in this case will be defined as being that in which the thickness of the blade forming the considered vane extends at the apex of the curvature of the convex shape. It is to be noted that, in all cases, the aforementioned vertical direction can, for each vane of the set of vanes according to the invention, have any orientation relative to the vertical direction of the vehicle.

According to the invention, each vane is rotatable about an axis of rotation substantially parallel to the longitudinal direction, i.e. to the main extension direction, of this vane. More specifically, each vane of the set of vanes according to the invention can move between a first closed end position, and a second open end position, between which it can assume all the intermediate angular positions about the axis of rotation thereof. It is thus possible to define, on the one hand, a closed position of the set of vanes according to the invention, in which the vanes forming this set are simultaneously all in their closed position and, on the other hand, an open position of the set of vanes according to the invention, in which the vanes forming this set are simultaneously all in their open position.

It must be understood herein that, within the set of vanes according to the invention, all the vanes are advantageously, at each instant, in the same relative angular position relative to their previously defined axis of rotation. In other words, in the set of vanes according to the invention, all the vanes are simultaneously rotated by the same angle about their respective axis of rotation.

In the closed position of the set of vanes according to the invention, the vanes of this set together form a substantially continuous surface. More specifically, this substantially continuous surface is configured to block the passage of an air flow through the set of vanes according to the invention. By way of a non-limiting embodiment, the closed position of the set of vanes according to the invention can correspond to a substantially zero angular rotation of each of the vanes about the axis of rotation thereof, with the angular position corresponding to the closed position of each of the vanes then being defined as the initial angular position for measuring the angle of rotation of these vanes.

In the open position of the set of vanes according to the invention, the vanes of this set authorize the passage of an air flow through the set of vanes according to the invention, without significantly modifying the flow. By way of a non-limiting embodiment, the open position of the set of vanes according to the invention can correspond to an angular rotation of the order of 90 degrees of each of the vanes about the axis of rotation thereof, with the angle of rotation being measured from an arbitrarily defined initial angular position.

Between their open position and their closed position, the vanes of the set of vanes according to the invention can assume all the intermediate angular positions, such that, when placed in an air flow that is intended to pass through them, the set of vanes according to the invention modulates the flow of such an air flow to a greater or lesser extent.

Advantageously, the vanes of the set of vanes according to the invention are assembled so that their respective axes of rotation are, to the nearest manufacturing and assembly tolerances, substantially parallel to each other. In other words, the vanes of the set according to the invention are assembled so that their longitudinal directions are all parallel to each other, without being coincident. The longitudinal direction of the set of vanes according to the invention is then defined as any of the longitudinal directions of each of the vanes of this set, with these all being parallel to each other.

In the set of vanes according to the invention, the vanes are assembled so that, in the previously defined closed position of this set of vanes, they are placed substantially side-by-side along their longitudinal edges, preferably in an overlapping configuration. According to one feature of the invention, the vanes can have a flexible lip on these longitudinal edges. In this way, the vanes can be arranged in the aforementioned closed position, the vanes are advantageously disposed so that a space remains between two adjacent vanes that is sufficient to allow each of these vanes to rotate, whilst preventing, in the closed position of each of these vanes, the passage of any air flow.

In order to perform simultaneous rotation of all the vanes, the set of vanes according to the invention comprises the common linkage. According to the invention, the common linkage is a complex shaped part that is substantially flat and is arranged, in the set of vanes according to the invention, substantially perpendicular, to the nearest manufacturing and assembly tolerances, to the previously defined longitudinal direction of the set of vanes according to the invention, i.e. substantially perpendicular to the direction of the axes of rotation of each of the vanes, with these being, as previously indicated, all parallel to each other.

According to the invention, each of the vanes is connected, at one of the ends thereof in the longitudinal direction thereof, to the common linkage, via at least one guide pad, so that a movement thereof simultaneously causes a corresponding movement of all the vanes of the set according to the invention.

More specifically, each of the vanes is connected, at one of the ends thereof in the longitudinal direction thereof, on the one hand, to a structural element, for example, the chassis or the frame of the front face module, or the housing of the cooling unit or even a support frame having bearings, in which the vanes are introduced, in particular the axes of rotation of the vanes, also called journals, and, on the other hand, to the common linkage. The movement of the plate causes the movement of the connection point of each vane on the plate and therefore causes the respective pivoting of these vanes about the fixed point of rotation formed by the junction zone of the vane and the structural element.

BRIEF DESCRIPTION OF THE DRAWINGS

The present invention will be described in greater detail below with reference to the drawings. In the drawings.

DETAILED DESCRIPTION OF THE INVENTION

Figure 1:
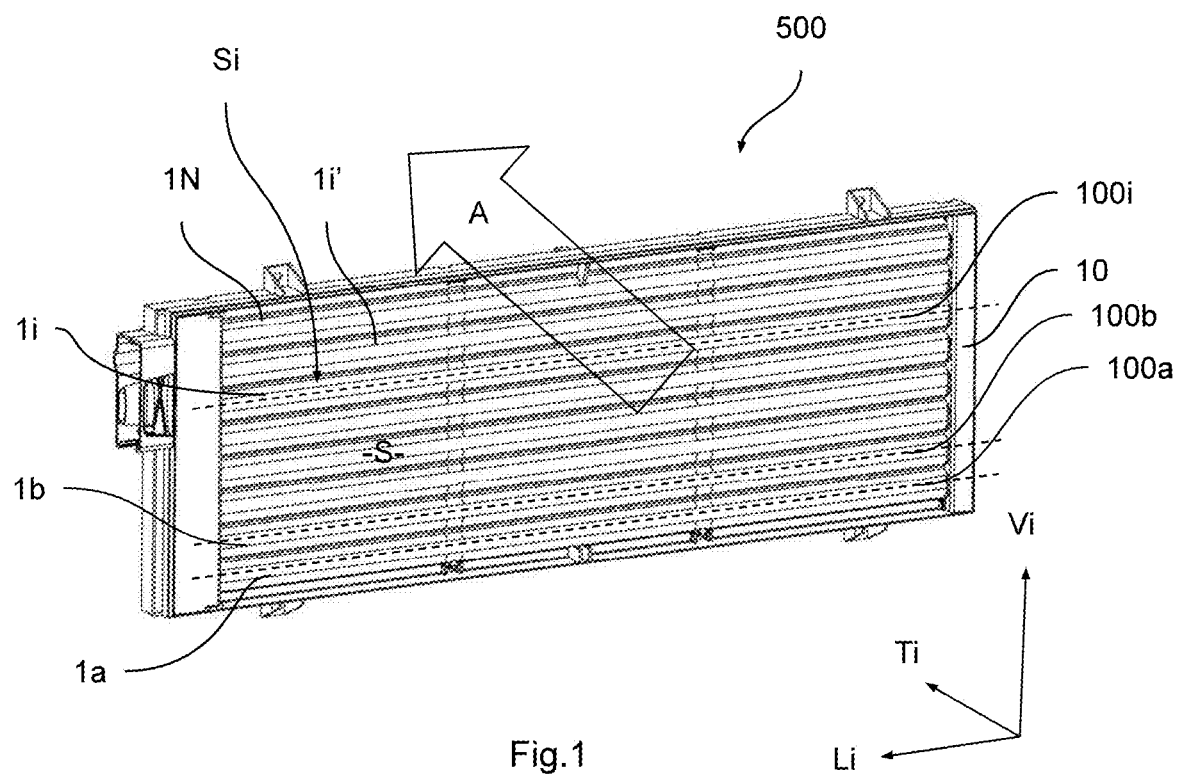
FIG. 1 is a schematic perspective front view of an air flow control device according to the invention, in the closed position thereof.

With reference to FIG. 1, an air flow control device 500 according to the invention can comprise a support frame 10 having N bearings or even the actual chassis of the front face module, into which N vanes 1a, 1b, . . . 1N are inserted, with each vane being rotatable about an axis of rotation, respectively 100a, 100b, . . . 100N. Hereafter, the generic designation 1i will be used for any one of the vanes 1a, 1b, . . . 1N, with it being understood that the vanes 1a, 1b, . . . 1N all individually have the same features relative to the invention. Therefore, the detailed description of the vane 1i that will be provided will be valid for all the vanes 1a, . . . 1N of the air flow control device 500 according to the invention. This notation applies to other components where necessary.

The air flow control device 500 according to the invention is intended to be placed in an air flow, shown by the arrow A in FIG. 1, in order to modulate the flow as a function of the position of the vanes 1a, . . . 1N relative to the flow direction of an air flow A. The air flow control device 500 according to the invention can be intended to be placed between an air intake of a motor vehicle, not shown in the figures, and a cooling unit of the vehicle, not shown in the figures, or be placed at the outlet of the cooling unit, between said unit and the elements of the vehicle to be cooled, or even in the front grill of the vehicle or just behind it. According to various embodiments, the cooling unit can be, in a non-limiting manner, a heat exchanger of a coolant circuit, or any other element of a heat transfer fluid circuit intended to cool one or more components of the considered vehicle. It is to be understood that A denotes here air flow as well as water flow in case the vehicle is crossing water (so called fording).

With reference to FIG. 1, a vane 1i of the air flow control device 500 according to the invention is in the general shape of a blade or of a thin panel extending in a main extension direction Li, also denoted hereafter as longitudinal direction Li of the vane 1i. With reference to the longitudinal direction Li, the transverse direction Ti of the vane 1i is defined as the direction which, with the aforementioned longitudinal direction Li, defines an active surface S1 of the vane 1i. An active surface Si is defined herein as the surface of the vane 1i intended to be placed in the aforementioned air flow A in order to modulate the flow as a function of the relative orientation of the surface Si relative to the direction of the air flow A. According to the non-limiting embodiment, more particularly illustrated in the figures, the vane 1i has, in the transverse direction Ti thereof, a substantially convex shape, for which the apex of the curvature is oriented opposite the aforementioned air flow A. In addition to the longitudinal Li and transverse Ti directions of the vane 1i, a vertical direction Vi of the vane 1i is defined that is perpendicular both to the aforementioned longitudinal direction Li and to the transverse direction Ti. In the shown embodiment, the vane 1i has honeycomb structure so that it has increased structural strength.

According to the embodiment that is more particularly illustrated in FIG. 1, the vertical direction Vi will be defined as being the direction along which the thickness of the vane 1i extends at the apex of the curvature of the convex shape assumed by this vane in the transverse direction Ti thereof. For each vane 1i, the longitudinal direction Li, the transverse direction Ti and the vertical direction Vi form a direct trihedron (Li, Ti, Vi) that is shown in FIG. 1.

It is clear from FIG. 1 that, in the air flow control device 500 according to the invention, the vanes 1i are assembled such that their longitudinal directions Li are all substantially parallel to each other, to the nearest manufacturing and assembly tolerances. More specifically, it is clear from FIG. 1 that the vanes 1i are stacked to form the air flow control device 500 according to the invention, such that their longitudinal directions Li, which are substantially parallel to each other, are not coincident to each other. Hereafter, the longitudinal direction of the air flow control device 500 according to the invention will denote any one of the aforementioned longitudinal directions Li.

According to the invention, each vane 1i is rotatable about an axis of rotation 100i substantially parallel to the longitudinal direction Li of this vane 1i. The result of the above is that the axes of rotation 100i of the various vanes 1i of the air flow control device 500 according to the invention are all, to the nearest manufacturing and assembly tolerances, distinct from each other and are substantially parallel to each other.

Each vane 1i of the air flow control device 500 according to the invention can move between a first closed end position and a second open end position, between which it can assume all the intermediate angular positions relative to the axis of rotation 100i thereof. It is to be noted that, according to the invention, all the vanes 1i are, at each instant, in the same relative angular position relative to their respective axes of rotation 100i. In other words, in the air flow control device 500 according to the invention, all the vanes 1i are simultaneously rotated by the same angle about their respective axes of rotation 100i.

FIG. 1 more specifically shows the air flow control device 500 according to the invention in the closed position for all the vanes 1i forming this set. This position is also called the closed position or configuration of the air flow control device 500. In this position, it is clear from FIG. 1 that the previously defined active surfaces Si of the vanes 1i together form a substantially continuous surface S. As shown in FIG. 1, the substantially continuous surface S is configured to prevent the passage of the previously defined air flow A through the air flow control device 500 and it has a curvature that is adapted to the integration of the set of vanes in the motor vehicle.

In other words, each vane 1i is rotatable about an axis of rotation 100i and is configured to transition from a configuration or position, called open or opening configuration or position, of the frame 10 where each vane 1i opposes the passage of the air flow through the opening defined by the frame 10 as little as possible, to a configuration or position, called closed or closing or sealing configuration or position, of the frame 10 where each vane 1i opposes the flow of the air flow as much as possible, with the set of vanes 1i preventing the air flow from passing through the opening of the frame 10.

In other words, the various vanes 1i are arranged within the air flow control device 500 such that, in the closed position thereof, they are placed substantially side-by-side along their longitudinal edges. The angular position of each vane 1i about the axis of rotation 100i thereof in the closed position of the considered vane will be arbitrarily denoted as 0 degrees.

Figure 3:
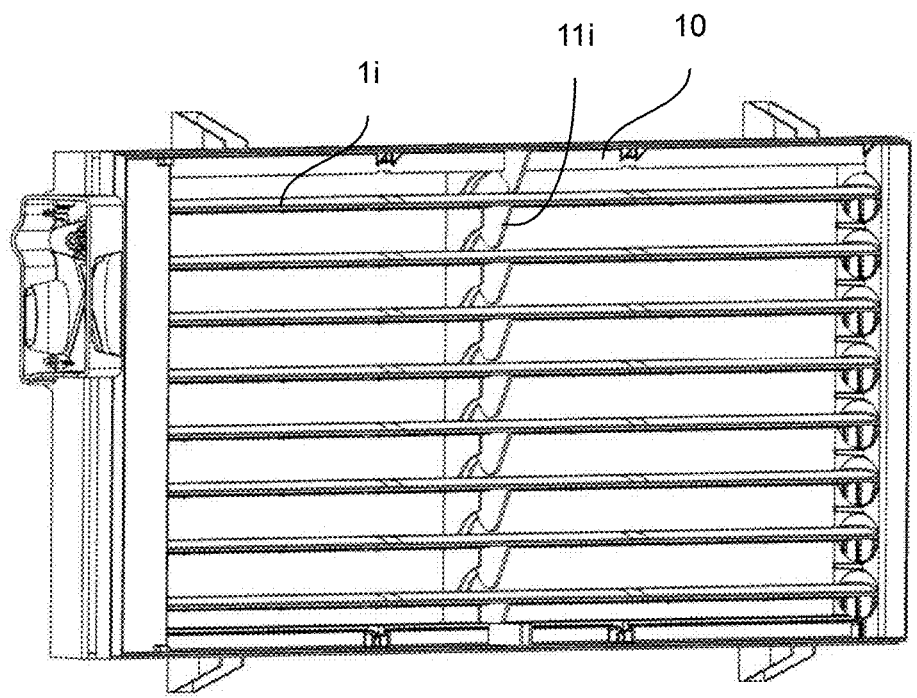
FIG. 3 is a schematic perspective front view of an air flow control device according to the invention, in the open position thereof.
Figure 4:
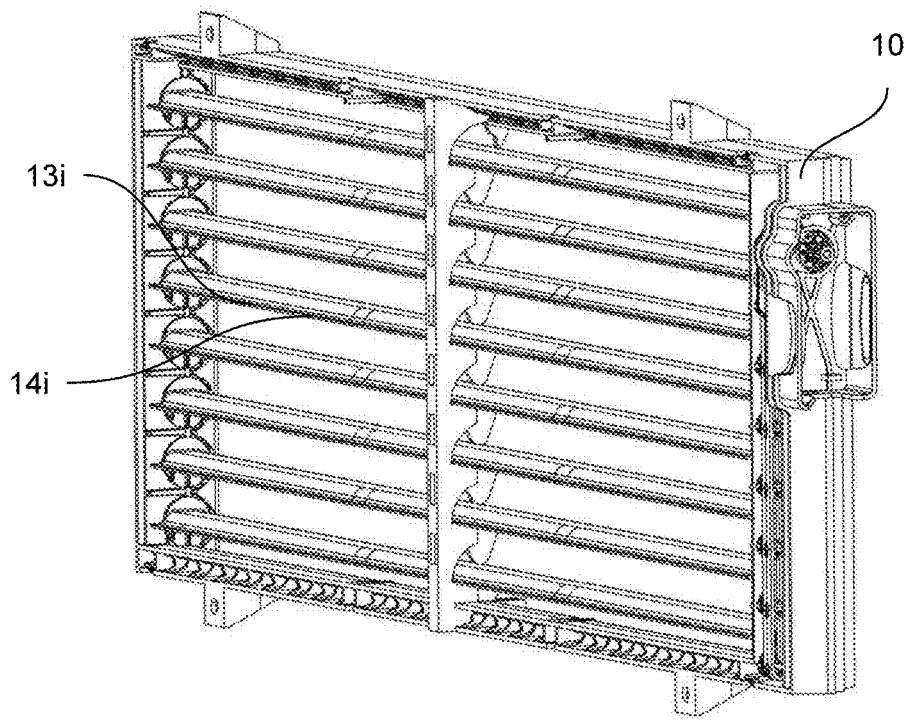
FIG. 4 is a schematic perspective back view of an air flow control device according to the invention, in the open position thereof.

In the open position of the vanes 1i, shown in FIGS. 3 and 4 and also denoted open position of the air flow control device 500 according to the invention, the vanes 1i authorize the passage of an air flow A through the air flow control device 500 without significantly modifying the flow of this air flow. With reference to the previously defined angular position, corresponding to the closed position of each vane 1i, the angular position of each vane 1i about the axis of rotation 100i thereof, in the open position of the considered vane 1i, could be, by way of a non-limiting embodiment, of the order of 90 degrees.

Between the open position of the air flow control device 500 according to the invention and its closed position, the vanes 1i forming this set can assume all the intermediate angular positions relative to their respective axes of rotation, in order to modify the amount of air passing through the air flow control device 500 and, therefore, to modulate the air flow A passing through said air flow control device 500.

According to an embodiment, each vane 1*i* is substantially flat in the transverse direction Ti thereof.

Figure 2:
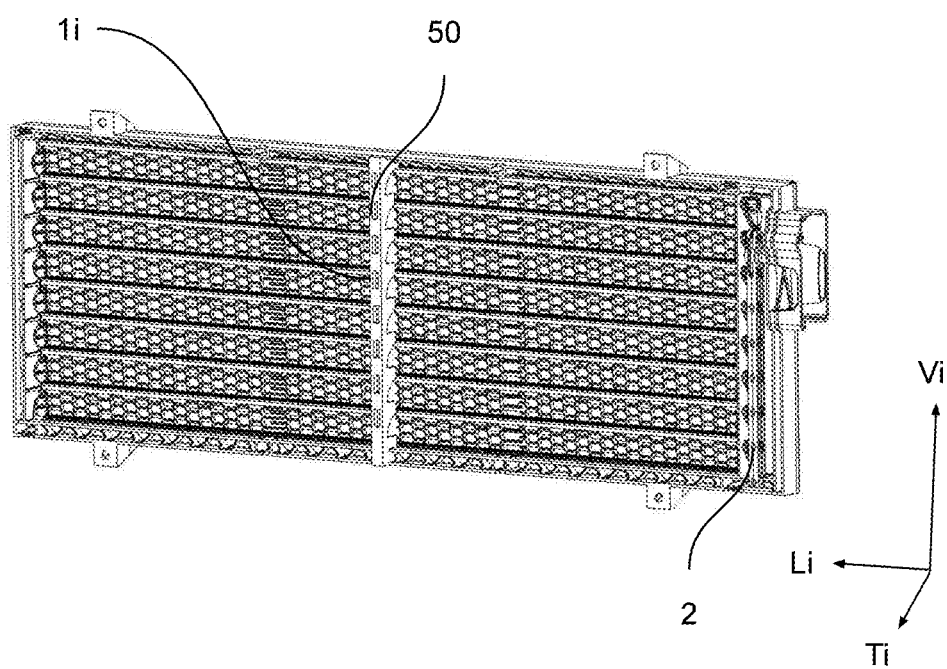
FIG. 2 is a schematic perspective back view of an air flow control device according to the invention, in the closed position thereof.

As shown in for example in FIG. 2, the air flow control device 500 according to the invention also comprises a common linkage 2. The common linkage 2 is a complex, substantially flat part that is arranged substantially perpendicular, to the nearest manufacturing and assembly tolerances, to the previously defined longitudinal direction L of the air flow control device 500, i.e. also substantially perpendicular to the axes of rotation of the vanes 1*i* forming this set.

According to the invention, each vane 1*i* of the air flow control device 500 is connected, at one of the ends thereof in the previously defined longitudinal direction Li thereof, on the one hand, to the frame 10, to define a fixed axis of rotation of the vane and, on the other hand, to the common linkage 2, in order to produce, by means of it, the drive about the fixed rotation point. In this way, a movement of said common linkage 2 simultaneously causes a rotation of each of the vanes 1*i* by the same angular value about the axis of rotation thereof.

FIG. 2 is a schematic perspective back view of an air flow control device according to the invention, in the closed position thereof. As it can be seen, the frame 10 comprises an integral support bar 50, for example injected as part of the frame 10, extending in Vi direction, which is perpendicular to the main extension direction Li of the vanes 1.

FIG. 3 is a schematic perspective front view of an air flow control device according to the invention, in the open position thereof. Each vane 1*i* includes a fin 11*i*. The fins 11*i* protrude from the vanes 1*i*, preferably perpendicular to their surface, for a distance substantially corresponding to the distance between vanes 1*i* in the open positions. In other words, the vanes 1*i* have height which is corresponding to the vanes pitch, leaving of course enough space so that vanes rotation between open and closed position is still possible. Such configuration allows to reduce vane vibration movement in the Vi direction in open position.

FIG. 4 is a schematic perspective back view of an air flow control device according to the invention, in the open position thereof. In one option, the edges 13*i* of the fins 10*i*, on one or both sides, can comprise a vibration damping material 14*i*. An example of such material can be rubber.

Figure 5:
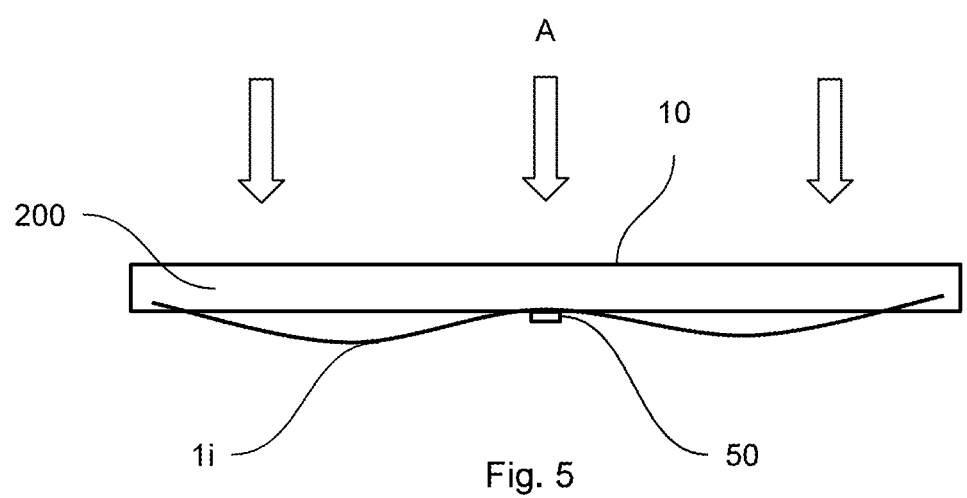
FIG. 5 shows schematically an embodiment of an air flow control device according to the invention in a top view.

FIG. 5 shows schematically an embodiment of an air flow control device according to the invention in a top view. Because of the presence of the support bar 50, the deformation due to pressure is limited.

Figure 6:
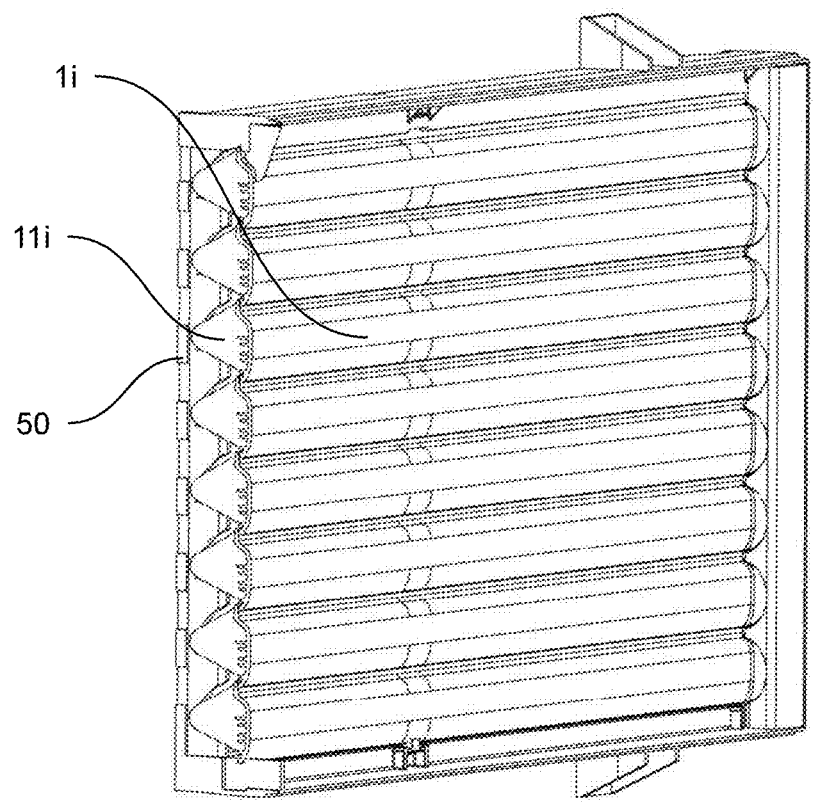
FIG. 6 shows a perspective section view of the air flow control device of FIG. 1.

FIG. 6 shows a perspective section view of the air flow control device of FIGS. 1 and 2. The vanes 1*i* have fins 11*i* configured to rest on the support bar 50 when the vanes 1*i* are closed and pressured towards the support bar 50. In other words, the vanes 1*i* are then deformed in direction Ti being perpendicular to the support bar 50 extension direction Vi and the vane 1*i* extension direction Li. The support bar 50 prevents excessive bending of the vanes 1*i*.

The support bar 50 can be perforated (have through-holes), in order to limit pressure drop at the open position of the vanes.

The fins 11*i* can have substantially triangular shapes.

In another embodiment, the fins 11*i* can have a substantially semicircular shape.

Figure 7:
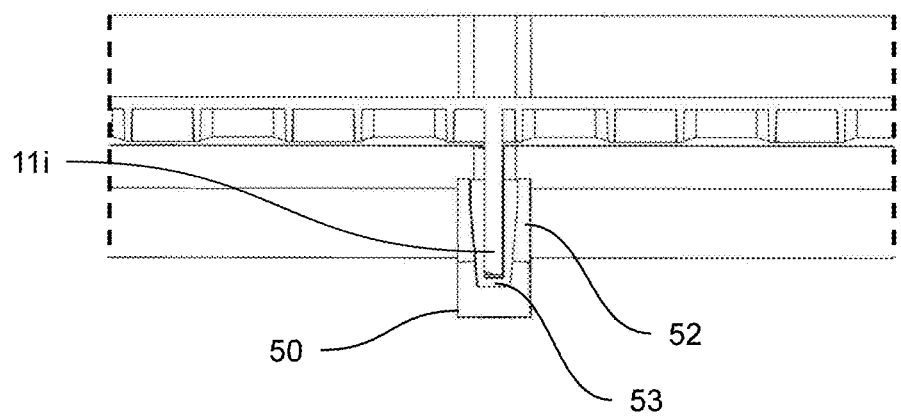
FIG. 7 shows partial cross sectional view of the air flow control device of FIG. 2.

FIG. 7 shows a partial cross sectional view of the air flow control device of FIG. 2. The support bar 50 has a guiding groove 52 extending along its length to receive fins 11*i* in any position. In other words, the guiding groove 52 extends along Vi direction. The guiding groove 52 receives the fins from three sides, leaving a small space 53 to enable smooth rotation of the vanes 1*i*. Effectively, any undesired movement of the vanes 1*i* is limited, in particular during rotation. Once the pressure is applied to the vanes 1*i* during movement of the air flow control device 500, the vanes 1*i* by means of fins 11*i* rest on the support bar 50.

Figure 8A:
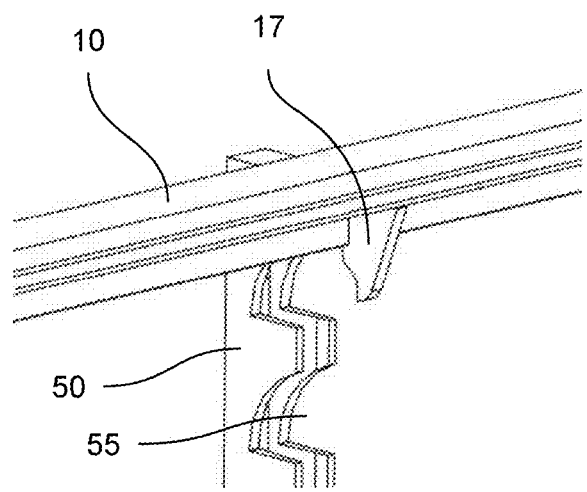
FIGS. 8*a*, 8*b* show a closer view of the top portion of support bar.
Figure 8B:
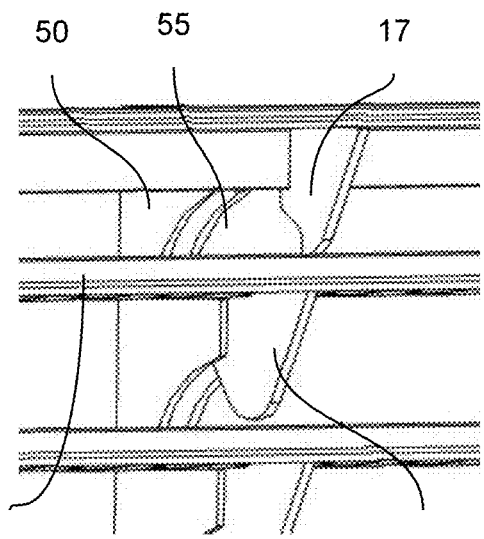

FIGS. 8*a*, 8*b* show a closer view of the top portion of a support bar 50. FIG. 8*a* shows illustratively the device 500 without vanes 1*i*, while FIG. 8*b* shows the same fragment with vanes 1*i* in place in an open position. The frame 10 comprises a support protrusion 17 at one end of the support bar 50 protruding towards the closest vane 1N so that it substantially abuts it in its open position. In other words, the support protrusion 17 extends in Vi direction so that it almost reaches, or completely reaches, the closest, for example the last, vane 1N, taking into account manufacturing tolerances. As a result, in the open position the closest vane 1N has its vibrational movement in the Vi direction restricted.

Also, the support bar 50 comprises quarter-circle cutouts 55 in which the vanes 1*i* in the closed position are received and supported, the cutouts 55 being shaped to guide the movement of the vanes 1*i* towards the open position.

Figure 9A:
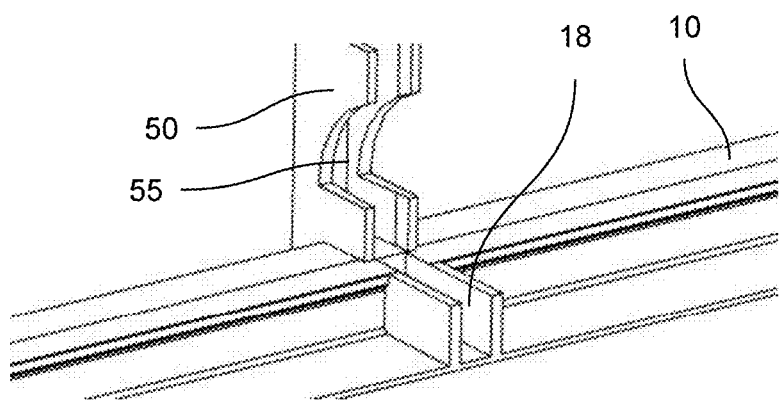
FIGS. 9*a*, 9*b* show a closer view of the bottom portion of support bar.
Figure 9B:
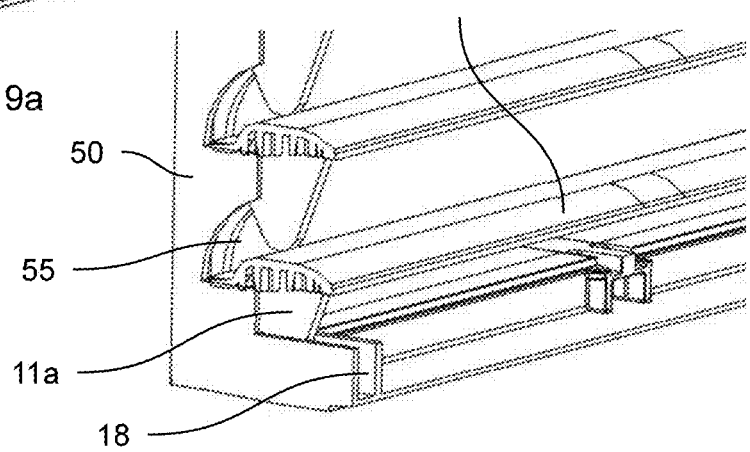

FIGS. 9*a*, 10*b* show a closer view of the lowest portion of a support bar 50. FIG. 9*a* shows illustratively the device 500 without vanes 1*i*, while FIG. 9*b* shows the same fragment with vanes 1*i* in place in an open position. The frame 10 comprises a support groove 18 at one end, for example the lowest end, of the support bar 50 configured to receive a fin 11*i* of the closest, for example last, vane 1*i*, taking into account manufacturing tolerances. As a result, in the open position the closest vane 1*a* has its vibrational movement in the Vi direction, as well as the Li direction, restricted.

In general, the Integration of a fin 11*i* in the back side of the vane 1*i* which is acting together with a support bar 50 integrated in the frame 10 allows to give stiffness under pressure at closed vanes position and rigidity between vane to vane and vane to frame under vibration at open vanes position.

Figure 10:
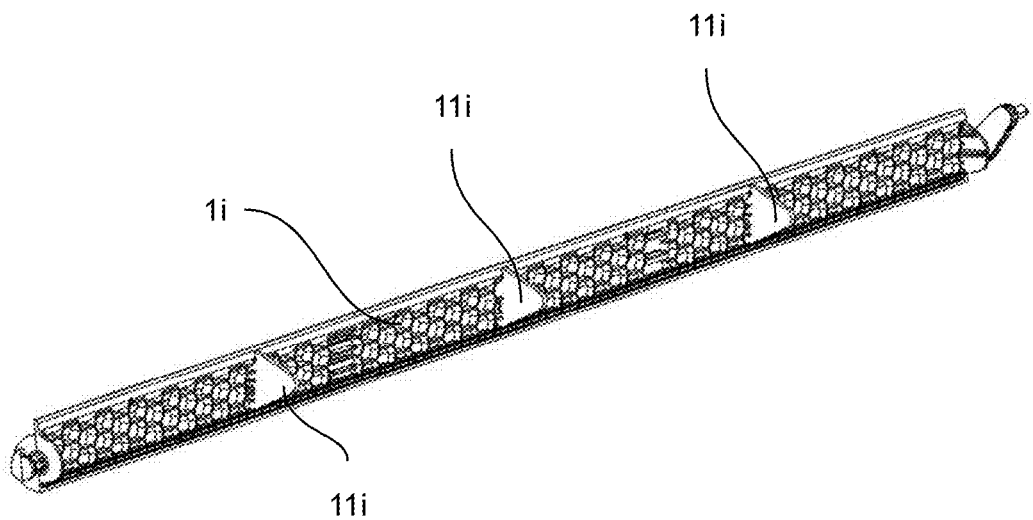
FIG. 10 illustrates an embodiment of a vane with plurality of fins.
Figure 11:
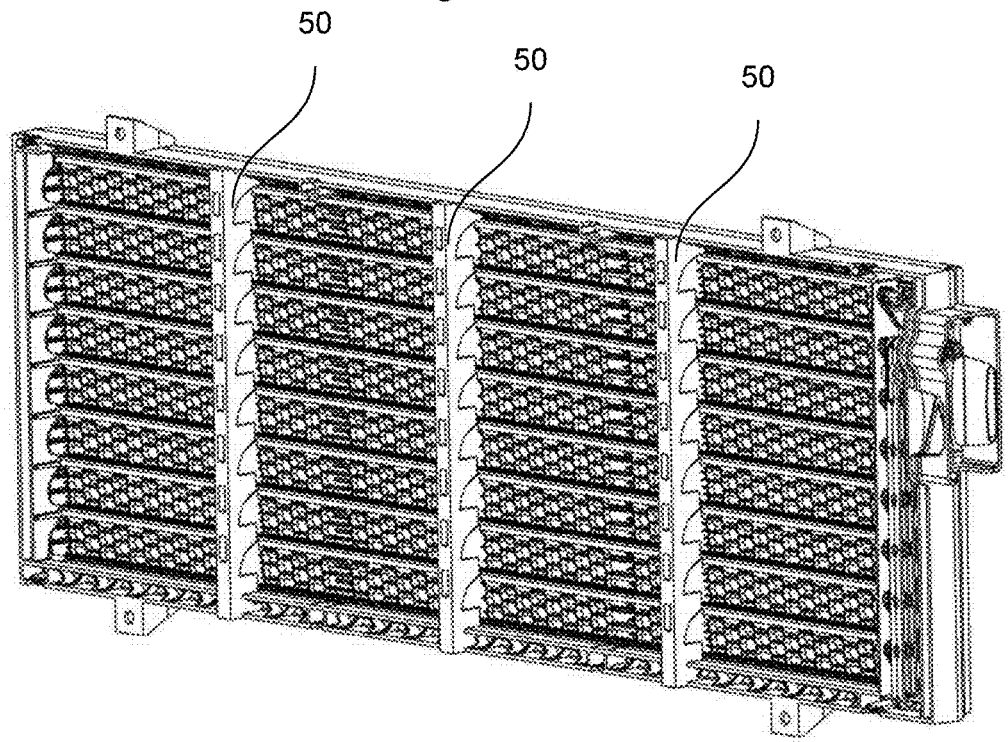
FIG. 11 shows an embodiment of an air flow control device with vanes of FIG. 10.

FIG. 10 illustrates another embodiment of a vane 1*i* with plurality of fins 11*i*, while FIG. 11 shows an embodiment of an air flow control device 500 with vanes of FIG. 10. It comprises a plurality of support bars 50, the vanes 1*i* comprising a plurality of respective fins 11*i* adapted to operate with said support bars 50*i*. In general, the smaller the distance between the support bars 50, the lower the deformation of the vanes 1.

In general, the benefit of the invention is that no additional support elements with respect to the frame are needed to ensure proper operation of the vanes in the open and closed position and during switching between them. The vanes slightly bent under pressure are enabled to hold the locked position through contact with the support bar. Additionally, the assembly of the vanes to the frame can be done in Ti direction solely and in a single manufacturing step. Compared to designs with additional clamping or supporting bearings for the vanes, the number of components is reduced, thereby reducing the cost of the device and its manufacturing process. Also, because the number of components is small, there is no need for costly quality assurance equipment and processes.

In one embodiment, in case of fording at 30 km/h, the length of the vane to cover flow passage area is 600 mm. In such a case, a maximum permissible deformation of the vane in Ti direction is 10 mm. In order to respect the maximum deformation in the vanes exposed to fording pressure, it is required to have two support bars with two respective fins within the vane.

The vanes can be made of PA-66, PP. The frame can be made of PP, nylon, ABS.

Other variations to the disclosed embodiments can be understood and effected by those skilled in the art in practicing the claimed invention, from a study of drawings, the disclosure, and the appended claims. The mere fact that certain measures are recited in mutually different dependent claims does not indicate that a combination of these measures cannot be used to the advantage.

The invention claimed is:

1. An air flow control device for a front face module of a motor vehicle, said control device comprising:
    a frame, with the frame including an integral support bar; and
    a plurality of vanes, the plurality of vanes extending within the frame and being attached thereto in a rotatable manner, each vane being rotatable about an axis of rotation substantially parallel to a main extension direction of each vane, the vanes being able to rotate between an open position and a closed position, with the integral support bar extending in a direction perpendicular to the main extension direction of the vanes, wherein each of the plurality of vanes has a fin configured to rest on the integral support bar when the vane is closed and pressured towards the integral support bar, wherein the fins protrude from the vanes for a distance corresponding to the distance between vanes in the open positions.

2. The control device of claim 1, wherein the frame includes a support protrusion at one end of the integral support bar protruding towards the closest vane so that it substantially abuts it in its open position.

3. The control device of claim 1, wherein the frame includes a support groove at one end of the integral support bar configured to receive a fin of the closest vane.

4. The control device of claim 1, wherein the integral support bar has a guiding groove extending along its length to receive fins in the open position, in the closed position and all the intermediate angular positions.

5. The control device of claim 4, wherein the support bar includes quarter-circle cutouts in which the vanes in the closed position are received and supported, the cutouts being shaped to guide the movement of the vanes towards the open position.

6. The control device of claim 1, wherein the support bar is perforated.

7. The control device of claim 1, wherein the fins have substantially triangular shapes.

8. The control device of claim 1, wherein the fins have substantially semicircular shapes.

9. The control device of claim 1, wherein the edges of the fins include a vibration damping material.

10. The control device of claim 1, wherein the control device includes a plurality of support bars, and the vanes include a plurality of respective fins adapted to operate with the plurality of support bars.

* * * * *